United States Patent
Endo

(10) Patent No.: US 9,121,691 B2
(45) Date of Patent: Sep. 1, 2015

(54) RECORDING MEDIUM DETERMINATION APPARATUS AND RECORDING MEDIUM DETERMINATION METHOD

(71) Applicant: SEIKO EPSON CORPORATION, Tokyo (JP)

(72) Inventor: Tsunenobu Endo, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 55 days.

(21) Appl. No.: 14/149,005

(22) Filed: Jan. 7, 2014

(65) Prior Publication Data

US 2014/0192368 A1    Jul. 10, 2014

(30) Foreign Application Priority Data

Jan. 7, 2013   (JP) ................... 2013-000372
Dec. 26, 2013  (JP) ................... 2013-268711

(51) Int. Cl.
*G01B 11/06* (2006.01)
*B41J 11/00* (2006.01)

(52) U.S. Cl.
CPC .............. *G01B 11/06* (2013.01); *B41J 11/0035* (2013.01); *B41J 11/0095* (2013.01)

(58) Field of Classification Search
CPC ..... G01B 11/06; G01B 11/02; B41J 11/0035; B41J 11/00095; B29C 49/78
USPC .................... 356/630–632; 369/112.01, 44.25
See application file for complete search history.

(56) References Cited

U.S. PATENT DOCUMENTS

| | | | | |
|---|---|---|---|---|
| 4,873,430 A | * | 10/1989 | Juliana et al. | 250/225 |
| 5,289,265 A | * | 2/1994 | Inoue et al. | 356/632 |
| 6,215,552 B1 | * | 4/2001 | Acquaviva et al. | 356/601 |
| 6,975,410 B1 | * | 12/2005 | Sturgill | 356/631 |
| 9,001,333 B2 | * | 4/2015 | Endo et al. | 356/446 |
| 2006/0023936 A1 | * | 2/2006 | Fujiwara | 382/149 |
| 2006/0146681 A1 | * | 7/2006 | Shiba et al. | 369/112.01 |
| 2006/0256341 A1 | * | 11/2006 | Kuwada | 356/445 |
| 2007/0046713 A1 | | 3/2007 | Miyahara et al. | |
| 2007/0222460 A1 | * | 9/2007 | Price et al. | 324/644 |
| 2008/0129995 A1 | * | 6/2008 | Werner et al. | 356/326 |
| 2010/0039473 A1 | | 2/2010 | Terada | |
| 2012/0134693 A1 | | 5/2012 | Hoshi et al. | |
| 2012/0194573 A1 | | 8/2012 | Yamashita et al. | |
| 2015/0062582 A1 | * | 3/2015 | Adachi et al. | 356/369 |

FOREIGN PATENT DOCUMENTS

| | | |
|---|---|---|
| JP | 2003-246129 | 9/2003 |
| JP | 2003-254721 | 9/2003 |

(Continued)

*Primary Examiner* — Hoa Pham
(74) *Attorney, Agent, or Firm* — Workman Nydegger

(57) ABSTRACT

A recording medium determination apparatus includes a light radiation unit which radiates light toward a recording medium; a light receiving unit which receives diffuse reflection light, which is light radiated from the light radiation unit and diffuse reflected by the recording medium; a reflection portion which can reflect transmitted light, which is radiated from the light radiation unit and transmitted through the recording medium, to cause the transmitted light to be incident to the recording medium again; a switching unit which switches a reflectance state such that a reflectance of the reflection portion changes; and a determination unit which determines a thickness of the recording medium on a basis of a value of a ratio between light amounts of a plurality of the diffuse reflection lights which are reflected by the reflection portion in different reflectance states and are received by the light receiving unit.

7 Claims, 12 Drawing Sheets

(56) References Cited

FOREIGN PATENT DOCUMENTS

| JP | 2006-168138 | 6/2006 |
| JP | 2007-030215 | 2/2007 |
| JP | 2007-093586 | 4/2007 |
| JP | 2010-042646 | 2/2010 |
| JP | 2012-127937 | 7/2012 |
| JP | 2012-128393 | 7/2012 |
| JP | 2012-131593 | 7/2012 |

* cited by examiner

FIG. 8

|   | DIFFUSE REFLECTION LIGHT | REGULAR REFLECTION LIGHT |
|---|---|---|
| 1 | R, G, B | R, G, B |
| 2 | R, G, B | R, B |
| 3 | R, G | R, B |
| 4 | R, B | G, B |
| 5 | G, B | R, B |
| 6 | G, B | G, B |
| 7 | R, G | G, B |

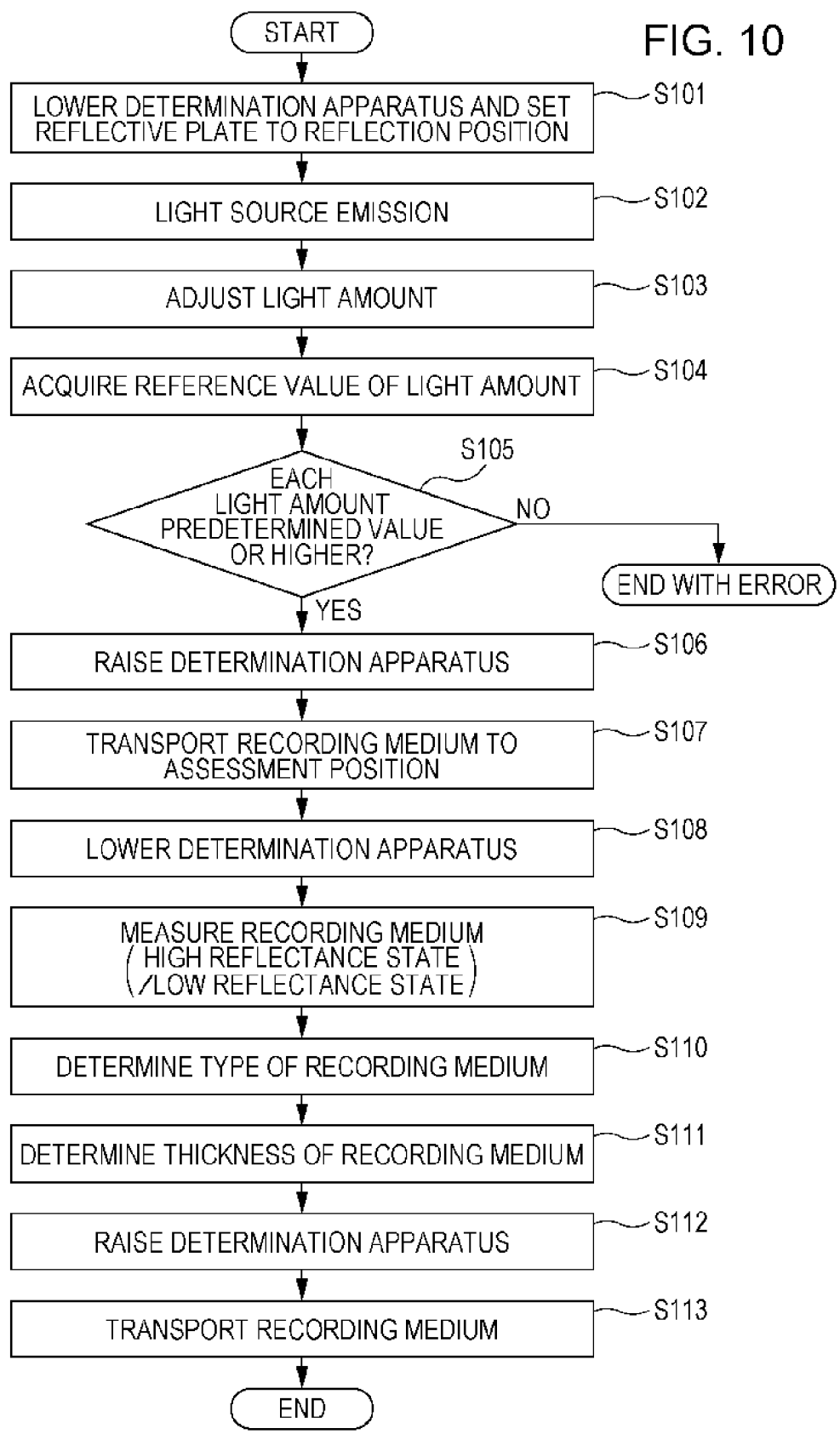

RECORDING MEDIUM DETERMINATION APPARATUS AND RECORDING MEDIUM DETERMINATION METHOD

BACKGROUND

1. Technical Field

The present invention relates to a recording medium determination apparatus and a recording medium determination method, each of which determines the thickness of a recording medium such as paper, for example, onto which an image is recorded.

2. Related Art

In technology in which an image is recorded onto a recording medium such as paper or a resin sheet, there is a case in which it is necessary to determine the thickness of the recording medium which is used, for example, in order to optimize the handling of the recording medium according to the characteristics thereof. As technology which is usable for this purpose, there is technology in which the thickness of the recording medium is measured optically, as disclosed in JP-A-2006-168138 and JP-A-2010-042646, for example.

In the technology disclosed in JP-A-2006-168138, the thickness of the recording medium is obtained from the distance to the recording medium surface by radiating light onto the recording medium, receiving the specular reflection light using a line sensor and detecting the position at which the received light amount is the greatest. In addition, in the technology disclosed in JP-A-2010-042646, the thickness of the recording medium is obtained on the basis of a detected light amount by positioning optical sensors in two locations, the distances between the optical sensors and the recording medium being different from one another, and performing detection of the reflected light.

Both of the technologies of the related art described above are capable of directly detecting the thickness of an arbitrary recording medium using an optical method. However, there is still room for improvement in the detection accuracy. In other words, in the technology disclosed in JP-A-2006-168138, since the thickness of the recording medium is obtained from the peak position of the reflection light intensity, the light concentrating properties of the radiated light influence the detection accuracy. In addition, since a line sensor is necessary for the detection, there is also a problem in that the cost of the apparatus increases. In addition, in the technology disclosed in JP-A-2010-042646, since the detection involves moving the optical sensor, there is a problem in that the positioning accuracy of the optical sensor influences the detection accuracy.

SUMMARY

An advantage of some aspects of the invention is to provide technology which can determine the thickness of the recording medium easily with high accuracy.

According to an aspect of the invention, a recording medium determination apparatus includes a light radiation unit which radiates light toward a recording medium; a light receiving unit which receives diffuse reflection light, which is light radiated from the light radiation unit and diffuse reflected by the recording medium; a reflection portion which can reflect transmitted light, which is radiated from the light radiation unit and transmitted through the recording medium, to cause the transmitted light to be incident to the recording medium again; a switching unit which switches a reflectance state such that a reflectance of the reflection portion changes; and a determination unit which determines a thickness of the recording medium on a basis of a value of a ratio between light amounts of a plurality of the diffuse reflection lights which are reflected by the reflection portion in different reflectance states and are received by the light receiving unit.

In addition, according to another aspect of the invention, a recording medium determination method includes radiating light toward a supported recording medium; and determining a thickness of the recording medium on a basis of a value of a ratio between light amounts of a plurality of the diffuse reflection lights which are reflected and received in different reflectance states, such that reflectances of the light, which is diffuse reflection light that is diffuse reflected by the recording medium, and of transmitted light, which is transmitted through the recording medium, are different.

In the inventions described above, the background of the recording medium, when viewed from the side to which radiated light is incident, is switched between a high reflectance state and a low reflectance state. The received diffuse reflection light contains the light which is reflected by the recording medium, and the light which is transmitted through the recording medium, reflected by the background thereof, is incident to the recording medium again and exits therefrom. The thicker the recording medium, the less light is transmitted through the recording medium. Therefore, it is considered that the difference between the reflection light amount in the high reflectance state and the reflection light amount in the low reflectance state is reduced. The invention uses this principal.

While the details will be described below, according to the experiments carried out by the inventor of the present application, in recording media of the same materials, it is understood that there is a marked correlation between the value of the ratio (hereinafter the ratio is referred to as the "light reduction ratio" in the present specification) of the reflection light amount in the low reflectance state in relation to the reflection light amount in the high reflectance state and the thickness of the recording medium. Accordingly, the thickness of the recording medium can be estimated if the light reduction ratio is obtained. In this manner, according to the invention, it is possible to determine the thickness of the recording medium easily with high accuracy.

As a more specific method, for example, the correlation between the thickness of the recording medium and the light reduction ratio can be obtained in advance for each type of the recording medium, and it is possible to determine the thickness of the recording medium on the basis of the information. In this manner, it is possible to perform determination of the thickness in regard to each of a plurality of types of the recording medium.

In addition, for example, the thickness of the recording medium may be determined on the basis of the light amount of a wavelength component within the diffuse reflection light with a wavelength of 650 nm or more. In a general recording medium such as paper or a resin sheet, while the recording medium exhibits high transmittance in relation to a comparatively long wavelength component within visible light, the short wavelength component is easily absorbed. Therefore, by using long wavelength visible light in this manner, the proportion of the light transmitted to the other main surface side of the recording medium increases, and the influence of the thickness of the recording medium in relation to the received reflection light amount increases. In other words, since the change in the value of the light reduction ratio in relation to the thickness of the recording medium increases, it is possible to widen the dynamic range of the measurement and to improve the determination accuracy. In the findings of the inventor of the application, it is preferable to use a wavelength component with a wavelength of 650 nm or more within the diffuse reflection light.

Here, in regard to the switching between the high reflectance state and the low reflectance state, for example, the distance of the reflection portion in relation to the support portion, which supports the recording medium, may be changed. While in a state in which the reflection portion is adjacent to the recording medium, the transmitted light is reflected by the reflection portion and is incident to the recording medium again, in a state in which the reflection portion is separated from the recording medium, the reflection light from the reflection portion is further reduced. By doing so, it is possible to easily switch between the high reflectance state and the low reflectance state.

Alternatively, for example, the relative positional relationship between the light radiation unit and the reflection portion may be changeable. In other words, by causing the position at which the light is incident to the recording medium, the high reflectance state and the low reflectance state may be realized. It is possible to realize the high reflectance state by radiating light onto a position in which the reflection portion is provided, and to realize the low reflectance state by radiating light onto a position in which the reflection portion is not present.

In addition, for example, a removal portion which removes foreign objects adhered to an opposing surface, which opposes the recording medium, of the reflection portion may be further provided. For example, when foreign objects such as paper dust adhere to the reflection portion, the reflectance of the light transmitted through the recording medium in the high reflectance state varies, and errors occur in the calculation of the light reduction ratio, which is performed on the basis of the received light amount. By providing a configuration for removing such foreign objects, it is possible to prevent erroneous determination of the thickness, which is caused by such errors.

BRIEF DESCRIPTION OF THE DRAWINGS

The invention will be described with reference to the accompanying drawings, wherein like numbers reference like elements.

FIG. 8 is a diagram which shows a combination of wavelength components from which it is possible to determine the recording medium.

FIG. 10 is a flow chart which shows the operations of a determination process according to the determination apparatus.

DESCRIPTION OF EXEMPLARY EMBODIMENTS

First, description will be given of the findings of the inventor of the application, which are the basis of the invention of the application, and the principles of the invention based thereon. The inventor of the application obtained the following findings by performing experiments on many types of recording medium in commercial circulation in order to investigate the characteristics of the diffuse reflection light which is emitted from the recording medium when light is radiated onto the recording medium.

Figure 1A:
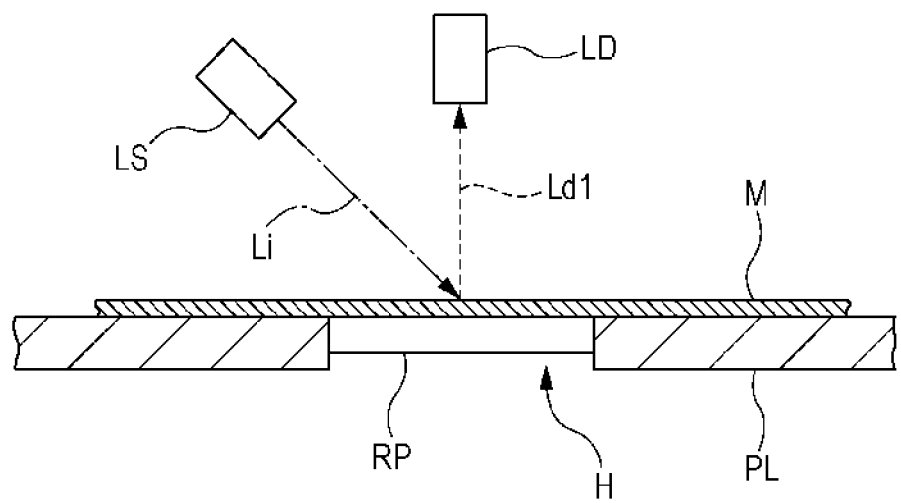
FIGS. 1A and 1B are views for illustrating the experiments carried out by the inventor of the application.
Figure 1B:
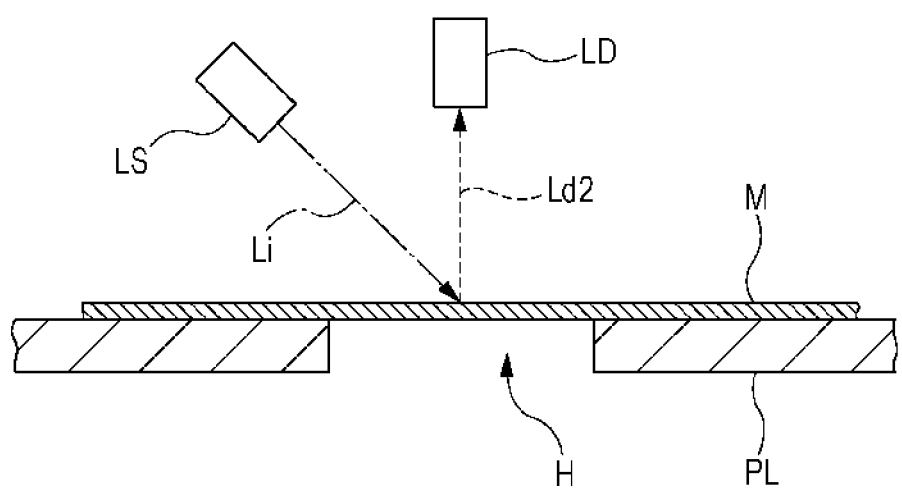

FIGS. 1A and 1B are views for illustrating the experiments carried out by the inventor of the application. As shown in FIG. 1A, a recording medium M was supported using a platen PL, which has a through hole H bored therein and a reflective plate RP with a high reflectance embedded in the through hole H, and light was radiated from the opposite side from the platen PL, from a light source LS toward a position facing the through hole H within the surface of the recording medium M. A light detector LD was disposed in a different position from the optical path of the specular reflection light at the surface of the recording medium M of incident light Li, and diffuse reflection light Ld1 from the recording medium M was received.

In addition, as shown in FIG. 1B, the light Li from the light source LS was similarly caused to be incident to the recording medium M, in a state in which the reflective plate RP was removed, and diffuse reflection light Ld2 was detected by the light detector LD at that time.

In the state shown in FIG. 1A, of the light Li incident to the recording medium M from one main surface (the upper surface), the transmitted light, which is transmitted through the recording medium M, is emitted from the other main surface (the lower surface) thereof which is supported by the platen PL, is reflected by the reflective plate RP with high reflectance and is incident to the recording medium M again. In other words, when viewed from the upper surface side of the recording medium M, the background of the recording medium M is in a high reflectance state. At this time, a portion of the light, which is incident to the recording medium M again, is emitted from the upper surface of the recording medium M and is detected as a portion of the diffuse reflection light by the light detector LD.

Meanwhile, in the state shown in FIG. 1B, since the reflective plate RP is not present, the background of the recording medium M is in a low reflectance state. Accordingly, the light, which is transmitted to the rear surface of the recording medium M, proceeds as-is without being reflected and is not incident to the recording medium M again.

Here, the ratio of the light amount of the diffuse reflection light Ld2 in the low reflectance state shown in FIG. 1B in relation to the light amount of the diffuse reflection light Ld1 in the high reflectance state shown in FIG. 1A is referred to as "the light reduction ratio". The inventor of the application investigated the correlation between the thickness of the recording medium and the light reduction ratio (Ld2/Ld1) using various recording media with different thicknesses, materials and surface processing. Here, a plurality of types of recording medium, which are possible to obtain, were prepared. Specifically, experiments were performed respectively using a plurality of sheets of three types of coated paper, the surfaces of which are subjected to a coating process and referred to as "matte paper", four types of resin coated paper, which are resin coated and referred to as "photographic paper", and five types of non-coated paper, which are not coated and are referred to as "normal paper" or "graphic paper" (including recycled paper). The results of the experiments are shown in FIG. 2.

Figure 2:
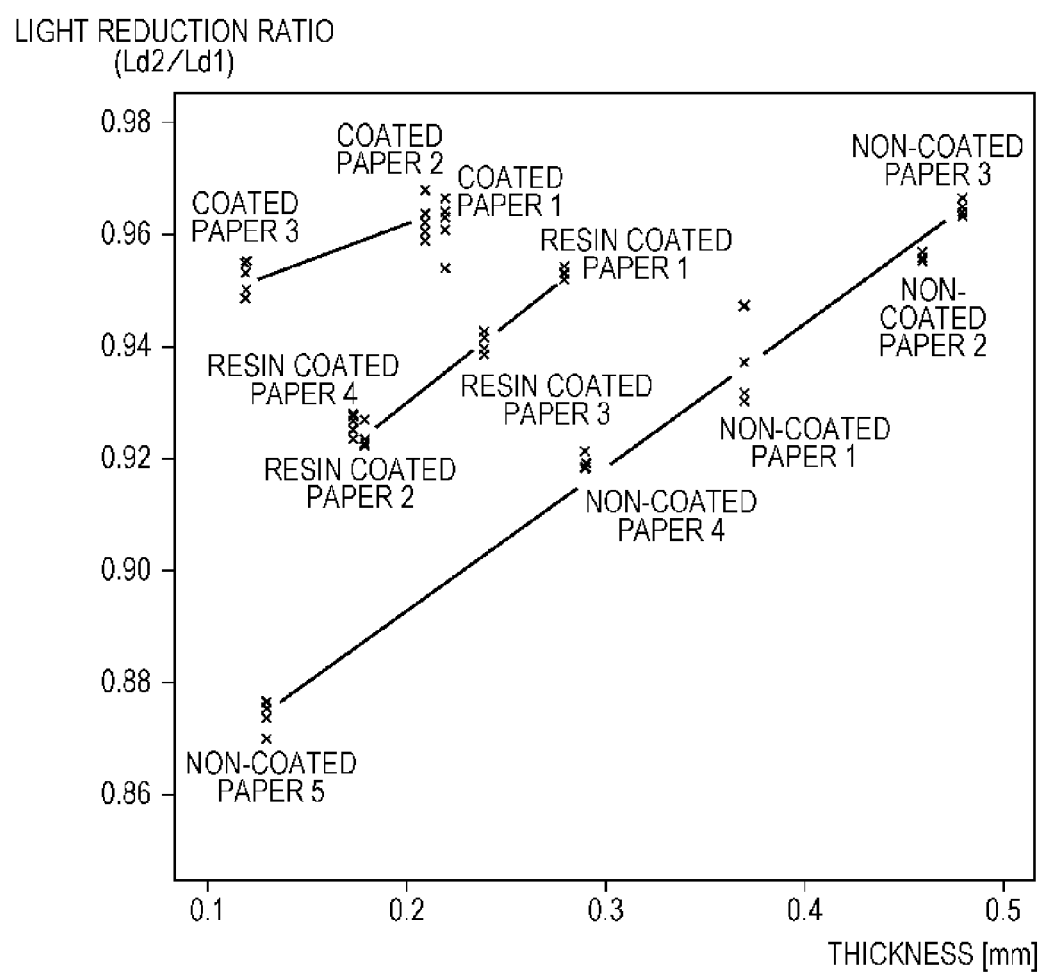
FIG. 2 is a diagram which shows the relationship between the thickness of the recording medium and the light reduction ratio.

FIG. 2 is a diagram which shows the relationship between the thickness of the recording medium and the light reduction ratio. As shown in FIG. 2, between the recording media of the same surface processing type, a substantially linear relationship is formed between the thickness of the recording medium and the light reduction ratio. Accordingly, if the type of the recording medium is known, it is possible to determine the thickness thereof with a high accuracy by obtaining the light reduction ratio. Specifically, the background of the recording medium is switched between a high reflectance state and a low reflectance state, light is radiated onto the recording medium in each state, and the light amount of the diffuse reflection light is detected. Furthermore, it is possible to obtain the thickness of the recording medium by obtaining the ratio (Ld2/Ld1) of the light amount in the low reflectance state in relation to the light amount in the high reflectance state, that is, by obtaining the light reduction ratio and referring to the relationships of FIG. 2.

Furthermore, due to the principle that the thickness of the recording medium M is obtained using the reflection of light which is transmitted from one main surface side of the recording medium M to the other main surface side, it is necessary for a portion of the incident light to be transmitted to the other main surface side. For this reason, it is necessary that the incident light be easily transmitted through the recording medium. Accordingly, it is preferable that the incident light have a comparatively long wavelength, and from a viewpoint of ease of detection and detection accuracy, it is possible to use, for example, from red to near infrared visible light. In the findings of the inventor of the application, when visible light with a wavelength of 650 nm or more is used, it is possible to obtain particularly favorable results.

Here, when the type of the recording medium used is predetermined, or, for example, when the type is specified by the input of settings by the user, if the type of the recording medium is identified, it is possible to immediately obtain the thickness of the provided recording medium from the light reduction ratio, which is obtained on the basis of the correlation between the light reduction ratio of the recording medium and the thickness. Meanwhile, when the type of the recording medium is not identified, it is necessary to perform determination of the thickness after first identifying the type of the recording medium. Therefore, in order to accommodate the various recording media, a function which determines the type of the recording medium before the determination of the thickness is convenient. In particular, being able to perform determination of the type of the recording medium using a common configuration with the configuration described above for performing the determination of the thickness is particularly favorable. Next, description will be given of a configuration which makes the common configuration described above possible and the circumstances which led to the design thereof.

The inventor of the application investigated the spectral distribution of the specular reflection light and the diffuse reflection light when light is radiated onto the recording medium in relation to many types of recording medium in commercial circulation. The specular reflection light, which is light reflected by the surface of the recording medium, is influenced by the surface state of the recording medium. Meanwhile, since the diffuse reflection light is light that is scattered in the inner portion of the recording medium and emitted again, the diffuse reflection light is more influenced by the characteristics of the material of the recording medium.

Figure 3:
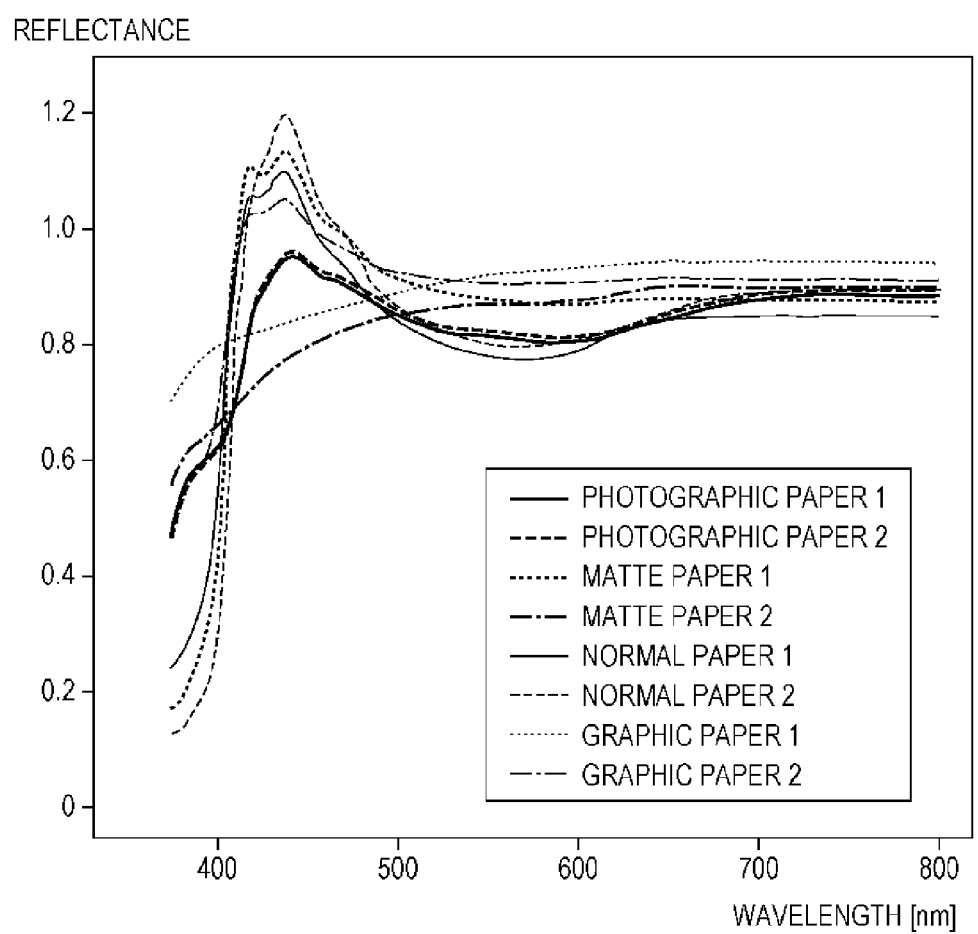
FIG. 3 is a diagram which shows the spectral distribution of the diffuse reflection light in each type of recording medium.

FIG. 3 is a diagram which shows the spectral distribution of the diffuse reflection light in each type of the recording medium. More specifically, FIG. 3 is a diagram which exemplifies a portion of the results of measuring the spectral distribution of the light which is diffuse reflected by the recording medium when white light of a tungsten light source is radiated onto various types of the recording medium. Furthermore, in FIG. 3, the ratio between the reflection light amount from the recording medium and the reflection light amount from the reference plate, when radiated light is caused to be incident to a predetermined white reference plate, is represented as the "reflectance". Accordingly, in a material with a higher reflectivity than the reference plate, there is a case in which the reflectance exceeds 1. Of the light radiated by the radiation unit, the light amount, which is recognized as received light by the light receiving unit, is varied due to the radiation amount of the radiation unit, the light receiving conditions of the light receiving unit, and the like. Therefore, it is possible to confirm the reflectance state of the recording medium in a stable manner by obtaining the ratio between the obtained light amount of the reflection light from the recording medium and the obtained light amount of the reflection light from the reference plate, where the combined conditions of the radiation unit and the light receiving unit are the same.

The radiated light is white light of a tungsten light source, which substantially does not contain a component of a wavelength of 370 nm or less to a wavelength of 400 nm or less. Alternatively, the radiated light is the high color rendering white light shown later in FIG. 5C, which substantially does not contain a component of a wavelength of 400 nm or less or a component of a wavelength of 700 nm or more, and while containing approximately the entire visible region (the wavelength range approximately from 400 nm to 750 nm), has peaks at the short wavelength side and the long wavelength side, respectively. The light was caused to be incident to the recording medium, spectral measurement of the diffuse reflection light was performed and the inventor of the application obtained the following findings.

In other words, as shown in FIG. 3, the reflectance of the diffuse reflection according to the recording medium depends on the wavelength, and the value of the reflectance at each wavelength differs greatly according to the type of the recording medium. In particular, while each recording medium exhibits a characteristic reflectance in a short wavelength region of a wavelength of approximately 400 nm to 500 nm and in a medium wavelength region of a wavelength of approximately 500 nm to 600 nm, the difference between the reflectance of each recording medium is comparatively small in a long wavelength region of a wavelength of approximately 600 nm or more.

In regard of these facts, instead of simply detecting the light amount of the entirety of the diffuse light, it is understood that there is a likelihood that it is possible to finely discern the difference in reflection characteristics of the recording media caused by a difference in material by individually detecting the reflection light amount for each wavelength component and combining and evaluating the detected values.

In other words, it is possible to determine many types of the recording medium with high accuracy by using the reflection light intensity of two or more wavelength components with different wavelengths from one another of the diffuse reflection light, in which incident light is diffuse reflected by the recording medium, in the determination. In this case, it is desirable that the incident light not contain an ultraviolet light component for the following reasons.

Figure 4:
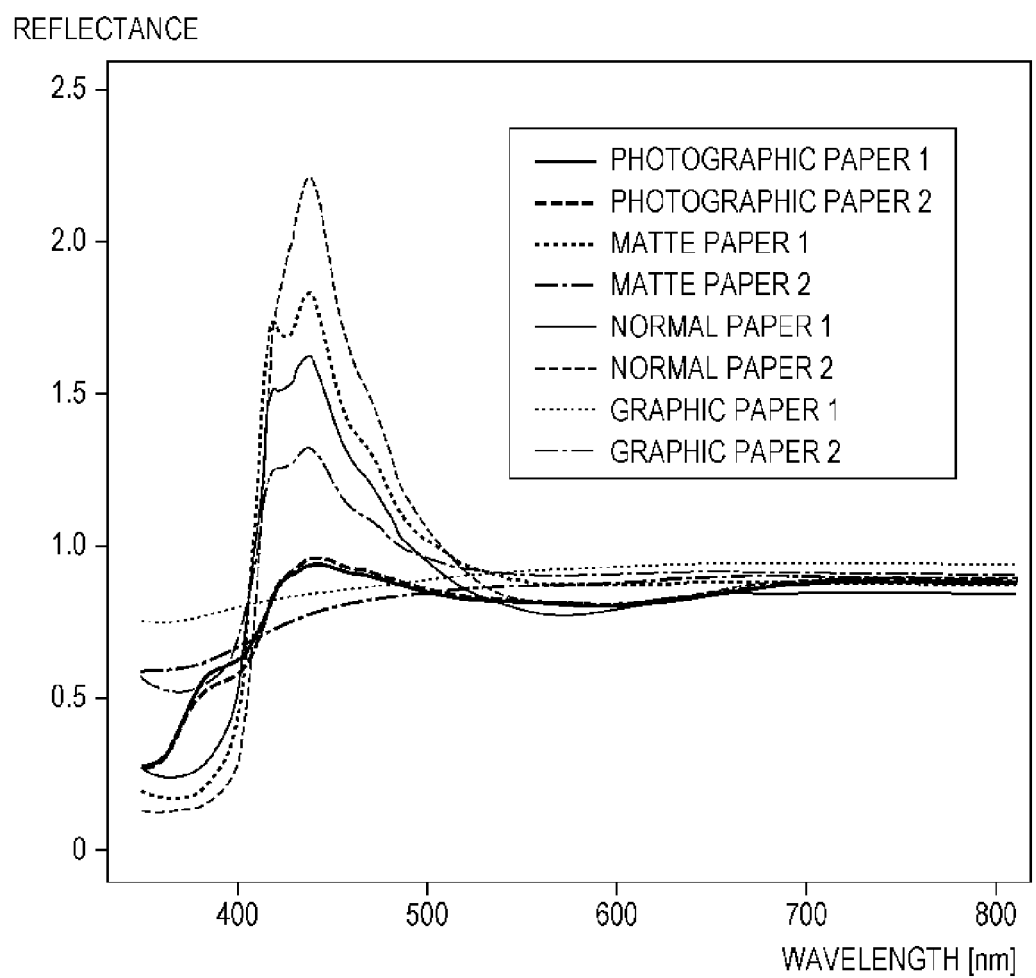
FIG. 4 is a diagram which shows the spectral distribution of the diffuse reflection light when light that contains ultraviolet light is caused to be incident to the recording medium.

FIG. 4 is a diagram which shows the spectral distribution of the diffuse reflection light when light that contains an ultraviolet light component is caused to be incident to the recording medium. When light containing the ultraviolet component is incident to the recording medium, in addition to a component formed by the incident light being reflected, since fluorescence, which is excited by a fluorescent whitening agent or the like contained in the recording medium, manifests in the short wavelength region, the apparent reflectance increases in the short wavelength region. Therefore, conversely, the difference in reflectance caused by the type of the recording medium is less conspicuous in the medium wavelength region and the long wavelength region. Naturally, in a recording medium which does not contain a fluorescent whitening agent, there is little fluorescence excited by ultraviolet light.

In this manner, while including an ultraviolet component in the incident light causes the difference for each recording medium to be prominent in a specific wavelength component, doing so compresses the difference for each recording medium in the other wavelength components. The compression is an obstacle to the technical idea of the invention, which aims to determine the type of the recording medium from the reflection light amount in two or more wavelength components. In addition, in the detected reflection light, a light component which is contained in the incident light from the outset and a fluorescence component which is excited by the ultraviolet light are intermixed in an indistinguishable state. Therefore, it may be difficult to detect only the pure diffuse reflection light component. For these reasons, it is desirable that the light incident to the recording medium not contain the ultraviolet light component which excites fluorescence. Naturally, it is permissible to contain a minuscule ultraviolet light component to an extent that the measurement in the visible region is not influenced.

As described above, by detecting the light intensity of two or more wavelength components contained in the diffuse reflection light, it is possible to determine the materials of many recording media. Meanwhile, even if the material of the substrate of the recording medium is the same, there is a case in which the type is distinguished by a difference in the surface processing. In this case, it is possible to determine the distinction using the light intensity of the specular reflection light.

The spectral distribution of the specular reflection light is substantially the same as the spectral distribution of the incident light in principle. Therefore, it is possible to determine the surface state of the recording medium if the light intensity of the specular reflection light of a specific wavelength component can be detected. In other words, if the light intensity of two or more wavelength components contained in the diffuse reflection light and the light intensity of at least one wavelength component contained in the specular reflection light can be obtained, then it is possible to identify the type of the recording medium, in principle. However, in an experiment using several dozen types of recording medium, which are possible to obtain commercially, it was understood that it is also desirable to use values of reflection light intensities of two or more wavelength components in relation to specular reflection light in order to accurately determine the recording media. In other words, a degree of wavelength dependence is also observed in relation to the reflection light intensity of the specular reflection light.

On the basis of the findings described above, in the embodiment, the light intensities of two or more wavelength components are individually obtained for the specular reflection light and the diffuse light, respectively, and determination of the type of recording medium is performed on the basis of the obtained values. More specifically, using the obtained light intensity of each wavelength component and a determination reference, which is set on the basis of the optical characteristics of a plurality of types of recording medium obtained in advance, it is determined which of the known recording media the recording medium that is the determination target correlates to. Therefore, it is possible to determine many types of recording medium with high accuracy.

Furthermore, when the type of the recording medium is determined, it is possible to determine the thickness of the recording medium from the relationship (for example, FIG. 2) between the light reduction ratio and the thickness in relation to the type. In this case, the receiving of the diffuse light for determining the type of the recording medium and the receiving of the diffuse light for determining the thickness of the recording medium can share a process. Hereinafter, description will be given of the configuration and operations of an apparatus for determining the type and the thickness of the recording medium.

Figure 5A:
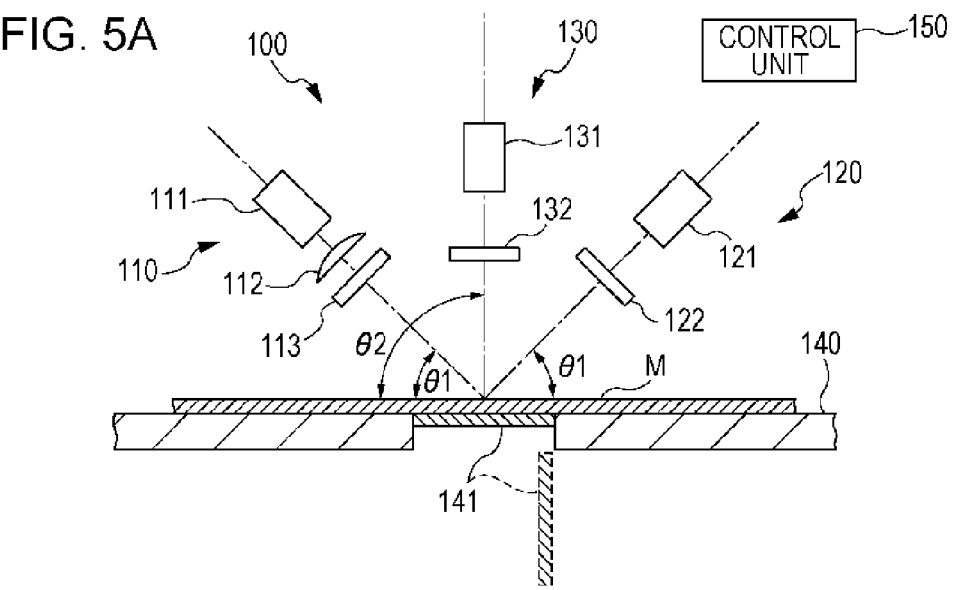
FIGS. 5A to 5C are a view and diagrams which show a specific configuration example of a determination apparatus according to an aspect of the invention.
Figure 5B:
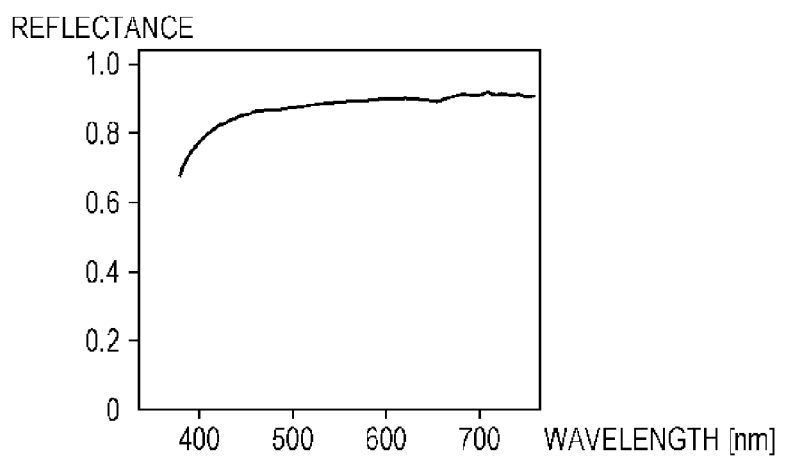
Figure 5C:
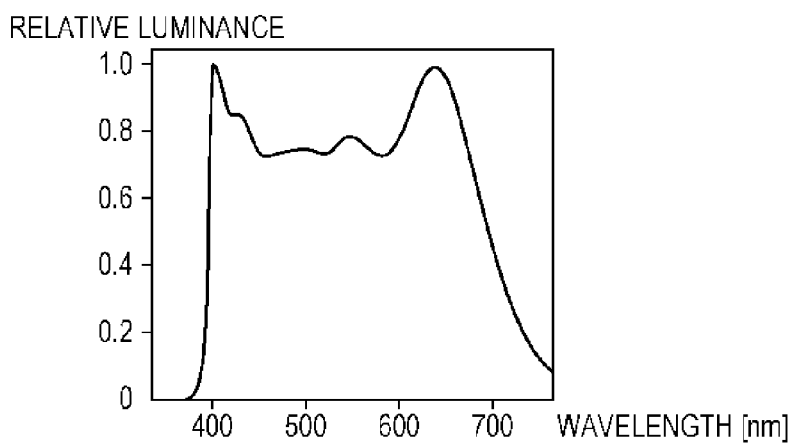

FIGS. 5A to 5C are a view and diagrams which show a specific configuration example of a determination apparatus, which executes recording medium determination, according to an aspect of the invention. A determination apparatus 100 is mounted onto various types of image recording apparatus such as a printer, a photocopier, or the like, which determines the type and the thickness of the recording medium. The printing method thereof is not particularly limited, and the determination apparatus 100 can be applied to various types of printing method such as a transfer method, an ink jet method and an electrographic method.

In the determination apparatus 100 of the configuration example shown in FIG. 5A, a light source apparatus 110 is provided above a platen 140, into which a reference reflective plate 141 with predetermined reflection characteristics is embedded. It is desirable that the reference reflective plate 141, as shown in the example of the reflectance characteristics in FIG. 5B for example, be a member with a white surface, which has a substantially fixed and comparatively high (for example, 0.75 or higher) reflectance in relation to a visible light region of approximately 400 nm to 750 nm. As materials which have such reflection characteristics, it is possible to use, for example, a sintered compact or a ceramic of a powder such as titanium oxide, barium sulfate or aluminum oxide. It is also possible to use an aggregate material, a foam material or the like of a powder such as a white plastic, for example, acrylic resin or polycarbonate resin. Furthermore, in order to prevent wear and taint damage, or to adjust the glossiness of the surface, the material may include a coating layer such as glass on the surface thereof.

When the term "reflectance" of the recording medium is referred to in the description below, the term is defined as the value of the ratio between the light amount of the reflection light detected in relation to the recording medium and the light amount of the reflection light detected in advance in relation to the reference reflective plate 141. The "reflectance" of the recording medium which is defined in this manner can be rendered to not easily receive the influence of individual variation of the characteristics of the light source or change over the passage of time, and contributes to an improvement in the determination accuracy. Furthermore, it is desirable that calibration, which re-detects the reflection light from the reference reflective plate 141, be appropriately executed.

The light source apparatus 110 is provided with a light source unit 111, a light concentrating unit 112 and an aperture unit 113. The light source unit 111 emits light with a predetermined spectral distribution and intensity. The light concentrating unit 112 concentrates the light emitted from the light source unit 111. The aperture unit 113 restricts the radiation direction of the concentrated light. The light source apparatus 110 radiates light toward the reference reflective plate 141 on the platen 140 diagonally from above. It is preferable to set the angle of incidence θ1 of the light to the reference reflective plate 141 from the light source apparatus 110 to approximately 30° to 60°, for example, to 45°.

Here, as the radiated light, it is possible to use white light with the spectral distribution shown in FIG. 5C, for example. In addition, as the light source unit 111, it is possible to use a white LED, for example. A discharge lamp such as a xenon arc lamp, an incandescent lamp such as a halogen lamp, or the like may be used as the light source. However, in this case, in order to reduce the ultraviolet light component, it is desirable to use a filter, which removes a wavelength component of 380 nm or less, or more preferably, 400 nm or less.

A specular reflection light detection apparatus 120 is disposed on the optical path of the light, which is emitted from the light source apparatus 110 and specularly reflected by the reference reflective plate 141. In other words, the angle at which the specular reflection light detection apparatus 120 faces the reference reflective plate 141 is substantially the same as the angle of incidence θ1. The specular reflection light detection apparatus 120 receives the specular reflection light from the reference reflective plate 141 and outputs a signal which corresponds to the received light amount.

Meanwhile, a diffuse light detection apparatus 130, which receives the diffuse reflection light from the reference reflective plate 141, is provided in a position facing the reference reflective plate 141 at an angle θ2, which is greater than the angle of incidence θ1. The angle θ2 can be set to, for example, 90°.

The specular reflection light detection apparatus 120 is provided with a light receiving unit 121, and an aperture 122. The light receiving unit 121 receives light, spectrally disperses the light into several wavelength components and outputs a signal corresponding to the received light amount for each component. The aperture 122 restricts the direction of the light incident to the light receiving unit 121. In the same manner, the diffuse light detection apparatus 130 is provided with a light receiving unit 131 and an aperture unit 132. The specular reflection light detection apparatus 120 and the diffuse light detection apparatus 130 can use similar configurations to one another.

Figure 6A:
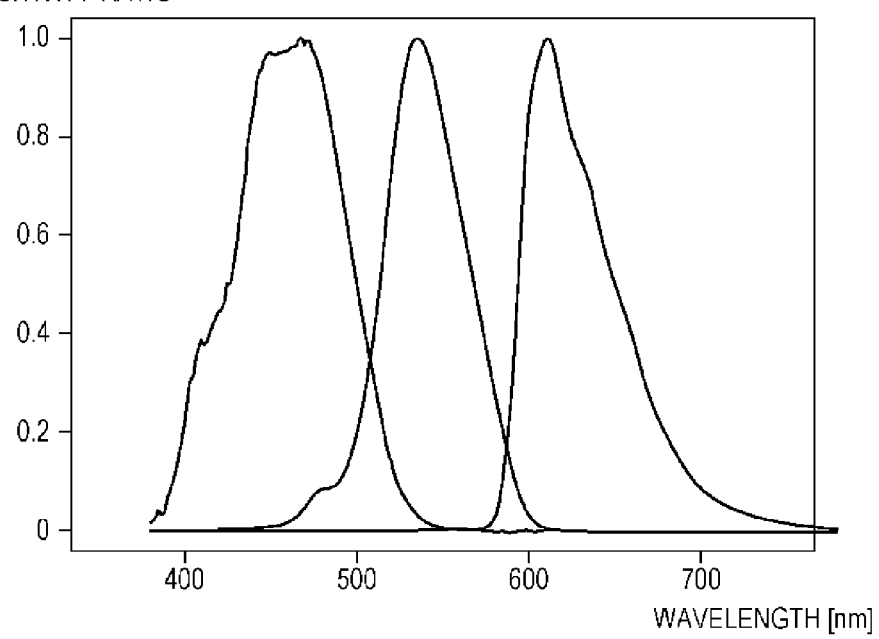
FIGS. 6A and 6B are diagrams which show an example of the spectral sensitivity characteristics of a light receiving unit.
Figure 6B:
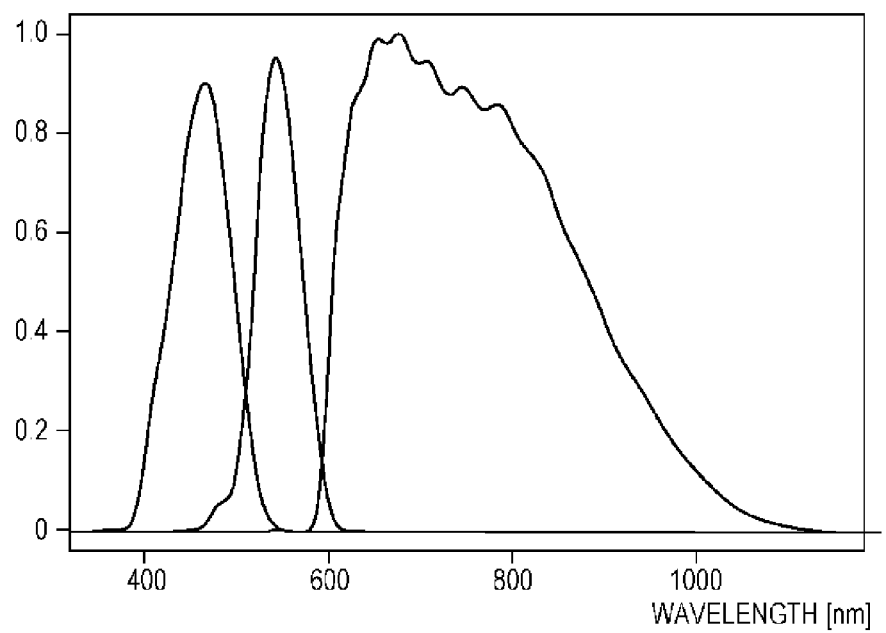

FIGS. 6A and 6B are diagrams which show an example of the spectral sensitivity characteristics of a light receiving unit. In the example of FIG. 6A, the incident light is spectrally dispersed into a blue (B) component of approximately a wavelength of 400 nm to 540 nm (with a center wavelength of 460 nm), a green (G) component of approximately a wavelength of 480 nm to 600 nm (with a center wavelength of 540 nm), and a red (R) component of approximately a wavelength of 590 nm to 720 nm (with a center wavelength of 620 nm to 660 nm). In addition, in the example of FIG. 6B, the spectral sensitivity of the R component is expended to the infrared region, and the band thereof is 590 nm to 1200 nm (with a center wavelength of 620 nm to 720 nm). The light receiving unit described above has representative characteristics of a practical RGB color filter, and can be used as a light receiving unit with such spectral sensitivity characteristics, for example, in a general color CCD sensor, a color CMOS sensor or the like. Therefore, it is possible to suppress the cost of the apparatus.

Returning to FIGS. 5A to 5C, description will be given of the configuration of a determination apparatus. In addition to each configuration element described above, the determination apparatus 100 is provided with a control unit 150, which manages the operations of the configuration elements and executes the determination process of the recording medium. In the determination apparatus 100, which is configured as described above, when the recording medium M, which is the determination target, is placed (supported) on the platen 140, light is radiated from the light source apparatus 110. While the specular reflection light thereof is received by the specular reflection light detection apparatus 120, the diffuse reflection light is received by the diffuse light detection apparatus 130. The specular reflection light detection apparatus 120 and the diffuse light detection apparatus 130 spectrally disperse the received light into each color of RGB, and output a signal corresponding to the received light amount for each component, to the control unit 150.

The control unit 150 determines the type of the recording medium on the basis of the value of the light amount of two or more wavelength components of each component of RGB of the specular reflection light, which is detected by the specular reflection light detection apparatus 120, and the value of the light amount of two or more wavelength components of each component of RGB of the diffuse reflection light, which is detected by the diffuse light detection apparatus 130.

In addition, as shown schematically by the dotted line in FIG. 5A, the reference reflective plate 141 attached to the platen 140 is configured to be capable of moving to a withdrawn position, which is separated downward from the platen 140, according to a control command from the control unit 150. In the high reflectance state, in which the reference reflective plate 141 is embedded in the platen 140, a portion of the lower surface of the recording medium M is supported by the reference reflective plate 141, and the light, which is incident to the recording medium M from the light source unit 111 and transmitted through the recording medium M, is reflected by a reflective surface of the upper surface of the reference reflective plate 141 and incident to the recording medium M again. A portion of the light, which is incident to the recording medium M again in this manner, is emitted from the upper surface (the one main surface) of the recording medium M and incident to the diffuse light detection apparatus 130. In other words, the light, which is detected by the diffuse light detection apparatus 130, is transmitted through the recording medium M and may contain the light which is reflected by the reference reflective plate 141. The reception of the reflected light for determining the type of the recording medium M is performed in a state in which the reference reflective plate 141 is disposed beneath the recording medium M.

Meanwhile, a state in which the reference reflective plate 141 is moved to the withdrawn position is the low reflectance state, in which there is no reflection by the reflective surface thereof, the light transmitted through the recording medium M proceeds downward as-is. The light, which is detected by the diffuse light detection apparatus 130 at this time, substantially does not contain the light, which is transmitted through the recording medium M and incident thereto again. The control unit 150 determines the thickness of the recording medium M on the basis of the light amounts of the diffuse light received in the high reflectance state, in which the reference reflective plate 141 is present beneath the recording medium M, and in the low reflectance state, in which the reference reflective plate 141 is not present, respectively.

Next, description will be given of the recording medium determination process according to the control unit 150. In the recording medium determination process according to the control unit 150, the reflection data of the specular reflection and the diffuse reflection is obtained in advance for each component of each color of RGB in relation to a plurality of types of the recording medium, which can be the determination target. Furthermore, when the recording medium M to be determined is provided, the light amounts of the specular reflection light and the diffuse reflection light are detected for each component of RGB in relation to the recording medium M. The detected values are compared with those of known recording media, and it is judged that the recording medium with the closest characteristics and the recording medium M are of the same type. In addition, the thickness of the recording medium M is obtained on the basis of the value of the light amount ratio (the light reduction ratio) of the diffuse reflection light received in the high reflectance state, and in the low reflectance state, respectively.

It is possible to perform the matching between the recording medium M, which is the determination target, and the known recording media using various methods. For example, the characteristics of the recording medium M may be analyzed using learned data, which is learned through machine learning of reflection characteristic data of known recording media, or a recording medium, which has close characteristics to those of the recording medium M, may be selected using well-known multivariate analysis technology. Here, description is given of an example of determination, which uses binary tree analysis constructed on the basis of known reflectance data, as a process example, which is suitable for computer processing.

Figure 7:
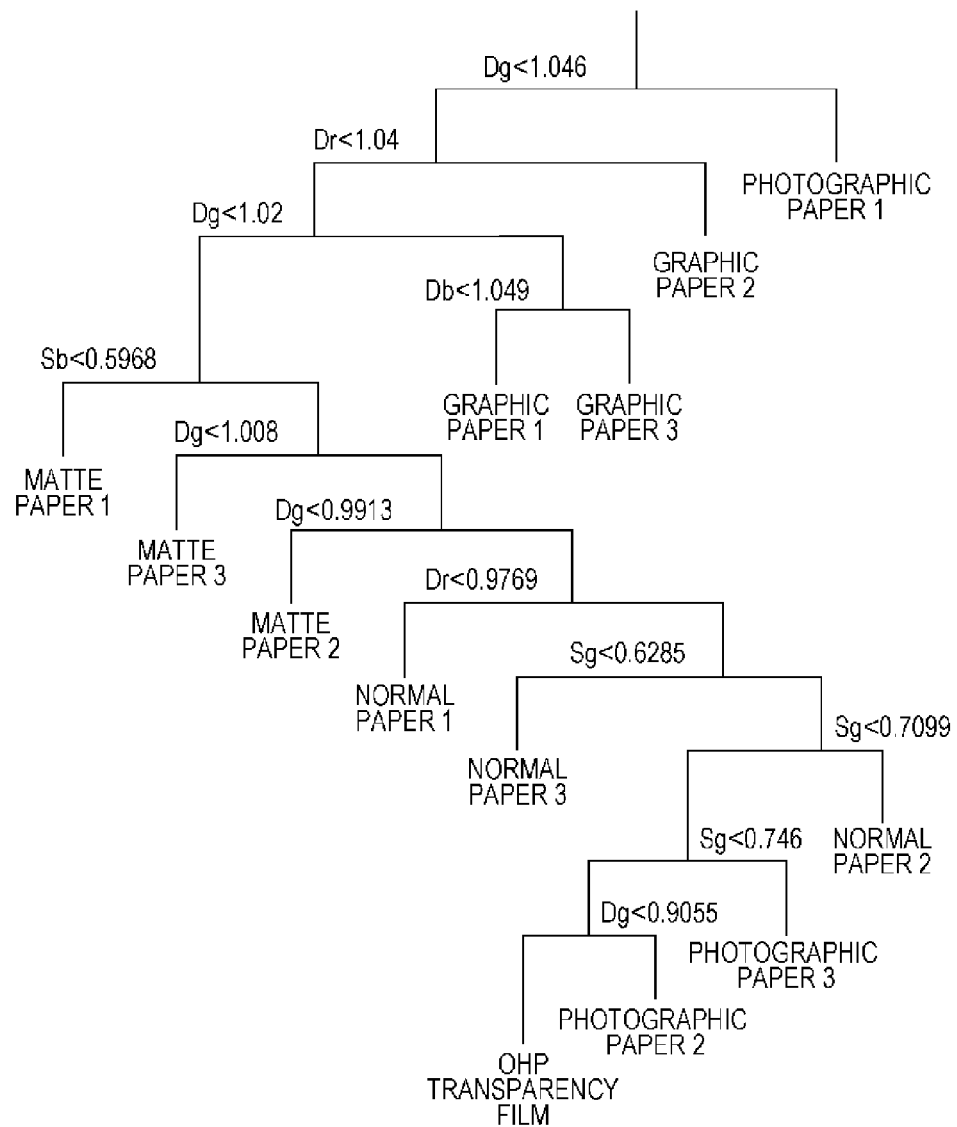
FIG. 7 is a diagram which shows an example of a binary tree obtained from well-known reflectance data.

FIG. 7 is a diagram which shows an example of a binary tree obtained from well-known reflectance data. In the example, of the various types of recording medium commercially available, 13 types were selected, and a binary tree was constructed for distinguishing each recording medium using the reflectance data of the specular reflection and the diffuse reflection, which are measured for each component of each color of RGB in relation to each selected type of recording medium. Specifically, three types of normal paper (normal paper 1 to 3), three types of photographic paper (photographic paper 1 to 3), three types of graphic paper (graphic paper 1 to 3), three types of matte paper (matte paper 1 to 3), and one type of ink jet printable OHP transparency film are selected. Furthermore, since the method of constructing the binary tree from sample data, and the technology for performing the determination on the basis of the constructed binary tree using computer processing are well known, description thereof will be omitted here.

In FIG. 7, the reference signs Sg and Sb respectively represent the value of the reflectance of the specular reflection light in green (G) and blue (B) components, and the reference signs Dr and Dg respectively represent the value of the reflectance of the diffuse reflection light in red (R) and green components. As the reflectance data, the reflectance of the red component in the specular reflection light and the blue component in the diffuse reflection light are present in addition to those described above, and hereinafter, the values thereof are respectively represented using the reference signs Sr and Db.

In relation to the recording medium M, which is the determination target, the reflectance is obtained from the light amount of each detected component, and it is possible to determine the type of the recording medium M by performing analysis using the constructed binary tree. More specifically, at each branching point of the binary tree, one value, which is specified from the obtained reflectance data, is selected and compared with a reference value. The determination of the type of the recording medium M is performed by searching toward the lower layers while selecting one of the children according to the magnitude relationship thereof. Accordingly, finally, one of the 13 types of recording medium, which are defined as the "leaves" of the binary tree, is reached and set as the determination result. In this example, as a result of constructing the binary tree using the reflectance data obtained from each recording medium, it is possible to reliably determine the 13 types of recording medium from the reflectance Sg and Sb of the two color components of the specular reflection light and the reflectance Dr and Dg of the two color components of the diffuse reflection light.

In this manner, it is not always necessary to have all of the reflectance data of the three color components each of the specular reflection light and the diffuse reflection light, respectively. In addition, the shape of the tree in the binary tree shown in FIG. 7, the type of reflection light component used in analysis and the numerical value of the reflectance are naturally considered to be different depending on the combination of recording media for which data is acquired in advance. However, the inventor of the application discovered that, in relation to over 30 types of commercially available recording medium, according to the result of trial and error while changing various combinations of reflectance data applied to the process, two or more wavelength components are necessary for the specular reflection light and two or more wavelength components are also necessary for the diffuse reflection light in order to obtain reliable determination. In other words, the combination of light intensities of a plurality of wavelength components with different reflection light from one another differs according to the types of recording media, and is necessary for determining the type of the recording medium.

FIG. 8 is a diagram which shows a combination of wavelength components from which it is possible to determine the recording medium. As shown in FIG. 8, naturally, it is possible to perform reliably determination if all of the components of RGB of the specular reflection light and the diffuse reflection light, respectively, are used. However, it was discovered that it is also possible to reliably perform determination with only two color components each of the specular reflection light and the diffuse reflection light, respectively. From the results shown in FIG. 8, it was discovered that it is preferable to use the blue component for the determination in relation to the specular reflection light, that it is preferable to use the blue component or the green component in relation to the diffuse reflection light, and furthermore, and that it is preferable that both the blue component and the green component be included in the four types of two components of specular reflection light and two components of diffuse reflection light.

In this manner, when the type of the recording medium is determined by detecting the specular reflection light and the diffuse reflection light of the visible light, which is radiated onto the recording medium, it is possible to perform determination with high accuracy by using the reflection light intensities of the blue component or the green component, which have a comparatively short wavelength even within the visible region. This is in agreement with the fact that the difference in reflection characteristics of each recording medium shown in FIG. 3, that is, the difference in reflection light amount of each recording medium is comparatively great at the short wavelength region and small at the long wavelength region. Accordingly, it is desirable that the radiated light mostly contain, within the visible region, a component of a short wavelength to a medium wavelength, that is, the blue component or the green component. However, when a fluorescence component, which is excited by an ultraviolet light component contained in the radiated light, is contained in the reflection light, the fluorescence component causes erroneous determination. Therefore, as the radiated light, it is desirable to use light, which essentially does not contain an ultraviolet light component, or has the ultraviolet light component removed in advance. A high color rendering white LED can be used favorably as the light source for this purpose.

Furthermore, as described above, it is possible to perform the determination of the type of the recording medium on the basis of the light amount detection results of two or more wavelength components of the specular reflection light and the diffuse reflection light, respectively. Accordingly, it is not mandatory to decompose the received reflection light into three color components (RGB). However, even when not all of the three color components are used in the determination, it is preferable that the apparatus include a three color component decomposition function. The first reason therefor is because there is a likelihood that if the combination of the plurality of types of recording medium, which is the determination target, changes, the color components used in the determination also change. The second reason is that, presently it is possible to easily obtain an optical device with a three color decomposition function, and there is a likelihood that the apparatus costs can be suppressed to a lower cost than that of preparing hardware for extracting only two wavelength components.

The third reason is that, while it is effective to use a short wavelength light component for the determination of the type of the recording medium, as described above, it is effective to use a long wavelength light component for the determination of the thickness of the recording medium. A configuration in which white light is caused to be incident to the recording medium M, and reflection light is spectrally dispersed into RGB components and received can flexibly accommodate all of the demands of the determination of each of the type and the thickness of the recording medium according to the technical idea.

Figure 9:
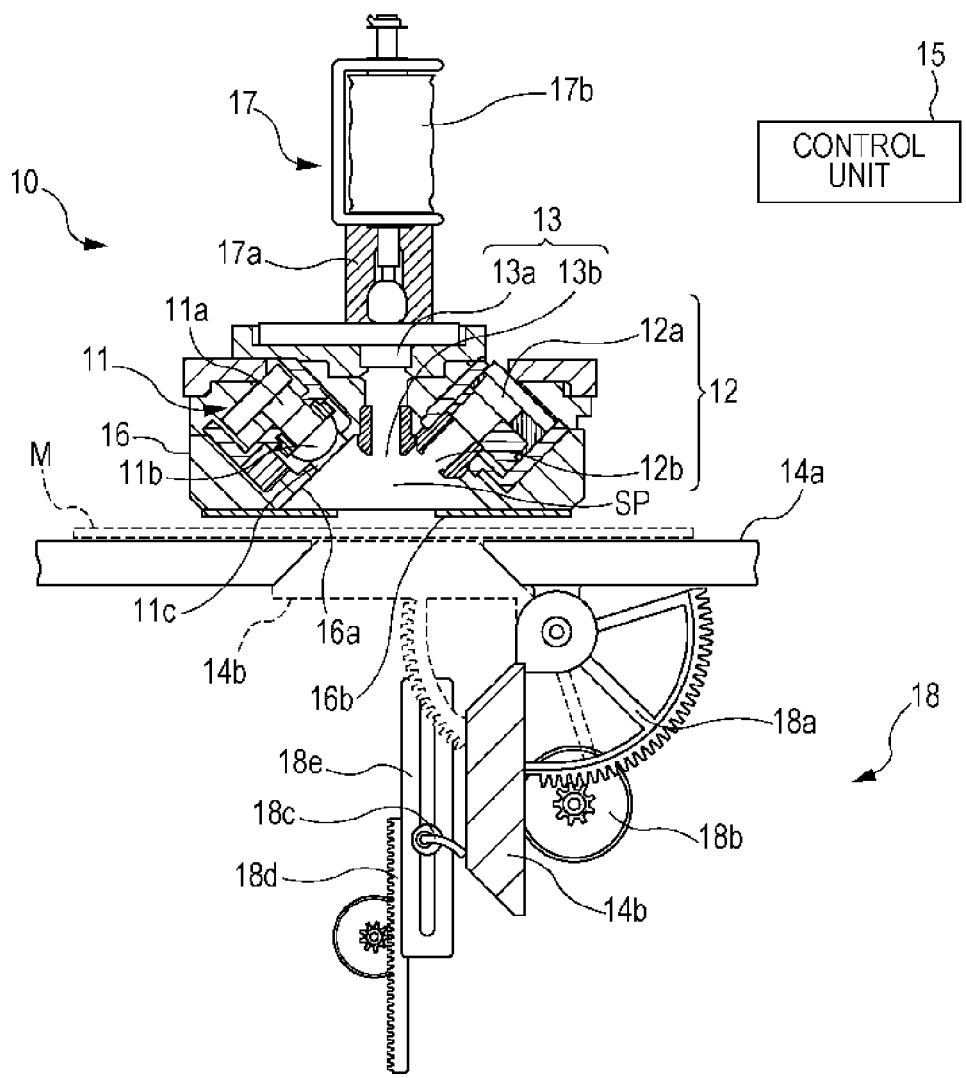
FIG. 9 is a profile cross-sectional view which shows a more specific configuration example of the determination apparatus.

FIG. 9 is a profile cross-sectional view which shows a more specific configuration example of the determination apparatus. A determination apparatus 10 is a first embodiment of the recording medium determination apparatus according to the invention. The determination apparatus 10 is provided with a light source unit 11, a specular reflection light reception unit 12 and a diffuse light reception unit 13, which correspond to the light source apparatus 110, the specular reflection light detection apparatus 120 and the diffuse light detection apparatus 130 of the determination apparatus 100, respectively. The components of the determination apparatus 10 are accommodated in a housing 16, which has an opening in the lower surface thereof and the inner portion thereof is a vacancy that functions as a measurement space SP. Disturbances by stray light and the like are prevented by maintaining the positional relationships between each of the units of the housing 16, and by performing radiation and reflection of the light within the vacancy of the inner portion.

It is generally preferable to set an inner wall surface 16a of the housing 16, which faces the measurement space SP, to matte black. However, white or mirror finish may also be used. In addition, an opening aperture 16b for preventing reflection light, which is reflected by the surface of a platen 14a other than a reference reflective plate 14b, from entering the measurement space SP is attached to the lower surface of the housing 16.

The platen 14a is disposed below the determination apparatus 10, and the reference reflective plate 14b is provided in a through hole, which is bored from a portion of the platen 14a, in an attachable and detachable manner. The platen 14a and the reference reflective plate 14b are respectively equivalent to the platen 140 and the reference reflective plate 141 described earlier. The reference reflective plate 14b is supported by a reflective plate rotation mechanism 18. More specifically, the reflective plate rotation mechanism 18 is provided with a rotation member 18a and a rotation drive unit 18b. The rotation member 18a has a row of teeth formed on the peripheral portion thereof and is axially supported to freely rotate. The rotation drive unit 18b rotationally drives the rotation member 18a by meshing with the row of teeth. The reference reflective plate 14b is fixed to the rotation member 18a, and when the rotation member 18a rotates due to the driving from the rotation drive unit 18b, the reference reflective plate 14b rotates around the rotating shaft of the rotation member 18a integrally with the rotation member 18a. Accordingly, the reference reflective plate 14b moves reciprocally between an engaged position (represented by a dotted line in FIG. 9) and a withdrawn position (represented by a solid line in FIG. 9). In the engaged position, the reference reflective plate 14b engages with the through hole of the platen 14a and the upper surface thereof is substantially the same planar surface as the upper surface of the platen 14a. In the withdrawn position, the reference reflective plate 14b is separated from the platen 14a, further downward than the engaged position. Since the reference reflective plate 14b rotates together with the spur gear 18a, while the reference reflective plate 14b assumes a substantially horizontal orientation in the engaged position, the reference reflective plate 14b assumes a substantially vertical orientation in the withdrawn position.

In the withdrawn position, a wiper 18c abuts one main surface, which is the upper surface in the engaged position, of the reference reflective plate 14b. The wiper 18c is supported by a wiper movement apparatus, specifically, by a wiper drive unit 18d and a wiper rail 18e. For example, the wiper drive unit 18d causes the wiper 18c to move up and down using a rack and pinion mechanism. In addition, the wiper rail 18e restricts the movement direction of the wiper 18c. According to the operations of the above described components, the wiper 18c moves in the up-down direction along the surface of the reference reflective plate 14b.

Foreign objects easily adhere to the surface of the reference reflective plate 14b due to minute separated material such as paper dust being generated from the recording medium M, and the reference reflective plate 14b being electrically charged when abutting and separating from the recording medium M. The variation in the reflectance caused by the adherence of such foreign objects causes erroneous determination. Therefore, a configuration is adopted in which the wiper 18c is caused to slide against the surface of the reference reflective plate 14b in order to scrape off adhered foreign objects. Furthermore, the removal portion which removes foreign objects, which are adhered to the reference reflective plate 14b, is not limited to being a wiper and may also have another structure. For example, it is possible to use a brush shaped or a roller shaped removal portion.

In a state in which the reference reflective plate 14b is positioned in a reflection position, the background of the recording medium M, which is placed on the platen 14a, is in a high reflectance state. Meanwhile, in a state in which the reference reflective plate 14b is positioned in the withdrawn position, the background of the recording medium M, which is placed on the platen 14a, is in a low reflectance state.

In addition, the housing 16 is maintained by a housing raising and lowering mechanism 17 so as to freely rise and lower. In other words, a lifting arm 17a, which extends upward, is attached to the upper portion of the housing 16. In addition, the lifting arm 17a moves up and down with the operation of a raising and lowering drive unit 17b due to a solenoid, for example. Therefore, the housing 16 rises and lowers to approach and separate from the platen 14a according to the operation of the raising and lowering drive unit 17b. In a state in which the housing 16 is most lowered, the lower surface of the housing 16 abuts the upper surface of the platen 14a directly, or via the recording medium M, which is placed on the platen 14a. Accordingly, it is possible to prevent the penetration of external light to the measurement space SP.

The light source unit 11 is provided with a high color rendering white LED 11a, which is the radiated light source, a condenser lens 11b, which converges the light emitted from the high color rendering white LED 11a, and an emission aperture 11c, which restricts the emission direction of the converged light. In addition, the specular reflection light reception unit 12 is provided with a light sensor 12a and an incidence aperture 12b. The light sensor 12a receives the specular reflection light from the reference reflective plate 14b or the recording medium. The incidence aperture 12b restricts the incidence of light to the light sensor 12a. In the same manner, the diffuse light reception unit 13 is provided with a light sensor 13a and an incidence aperture 13b. The light sensor 13a receives the diffuse reflection light from the reference reflective plate 14b or the recording medium. The incidence aperture 13b restricts the incidence of light to the light sensor 13a.

In addition, the determination apparatus is provided with a control unit 15, which controls each portion described above and executes the operations of a determination process for determining the type and the thickness of the recording medium on the basis of the light amount received by the light sensor. Next, description will be given of the operations of the determination process, which is executed by the control unit 15.

FIG. 10 is a flow chart which shows the operations of a determination process according to the determination apparatus. First, before the recording medium is placed on the platen 14a, the determination apparatus 10 is lowered by the housing raising and lowering mechanism 17 and the housing 16 is set to a state in which the lower surface thereof closely adheres to the upper surface of the platen 14a (step S101). At this time, the reference reflective plate 14b is set in the reflection position, in which the reference reflective plate 14b is embedded in the through hole of the platen 14a, by the reflective plate rotation mechanism 18. In this state, the white LED 11a, which is the radiated light source, emits light and light amount adjustment is performed such that the light amount is suitable for measurement and stable (step S102).

In this state, the specular reflection light and the diffuse reflection light from the reference reflective plate 14b are received by the specular reflection light reception unit 12 and the diffuse light reception unit 13, respectively, and the received light amount for each of the components of RGB is obtained. The values of each received light amount are acquired as the reference values when obtaining the reflectance of the recording medium (step S104). It is possible to obtain the determination results in a stable manner regardless of the variation of the characteristics of the light source and the light receiving unit or change over the passage of time by acquiring the reflection light from the reference reflective plate 14b as the reference value. In other words, the acquisition of the reference value is significant for the calibration of the determination apparatus. Furthermore, the received light amount of each component is assessed (step S105), and when the light amount does not reach a predetermined value, which is set in advance, the process ends with an error since it is suspected that there is a fault in the determination apparatus.

If each received light amount is normal, the determination apparatus 10 rises and is temporarily separated from the surface of the platen 14a by the housing raising and lowering mechanism 17 (step S106), the recording medium M, which is the determination target, is transported to the determination position directly under the determination apparatus 10 (step S107), and the determination apparatus 10 is subsequently lowered again to be set to a state in which the lower surface of the housing 16 closely adheres to the upper surface of the recording medium M (step S108).

In this state, light is radiated toward the surface of the recording medium M and the measurement of the specular reflection light and the diffuse reflection light is performed (step S109). More specifically, the light amounts of the specular reflection light and the diffuse reflection light from the recording medium M are measured by each color component separately in a high reflectance state, in which the reference reflective plate 14b is disposed at the lower portion of the recording medium M. Subsequently, the reference reflective plate 14b is moved to the withdrawn position, which is separated from the recording medium M, by the reflective plate rotation mechanism 18 and measurement of the diffuse reflection light is performed in a low reflectance state, in which the reference reflective plate 14b is not present at the lower portion of the recording medium M. Here, the measurement of at least the red (R) component of the diffuse reflection light is performed.

Furthermore, the type of the recording medium M is determined on the basis of the measurement results of the specular reflection light and the diffuse reflection light in the high reflectance state (step S110), and the thickness of the recording medium M is determined on the basis of the determination result of the type of the recording medium M and the light amount ratio (the light reduction ratio) between the red components of the diffuse reflection light measured in the high reflectance state and in the low reflectance state, respectively (step S111). The principle of the determination is as described above, and the actual process for realizing the determination is, for example, to store the correlation between the reflectance data or the light reduction ratio and the thickness of each type of the recording medium, which are measured in advance, in a database. Therefore, it is possible to decide the type and the thickness of the recording medium M by referring to the database on the basis of actual measured data of the recording medium M, which is the determination target. In regard to the thickness, the numerical value of the thickness may be directly calculated, and may also be classified as one of a plurality of grades, which are set in advance. When the type and the thickness of the recording medium are determined, the determination apparatus 10 rises and separates from the recording medium M (step S112), the recording medium M is transported out (step S113), and the process ends.

FIGS. 11A to 12B are views which show other embodiments of the invention. Furthermore, in each embodiment described below, the configuration itself of the determination apparatus 10 is common with that of the first embodiment described above, and only the surrounding configuration is mutually different. Therefore, in relation to the determination apparatus 10, the entirety thereof is given the reference numeral 10 and the reference signs of each component are omitted. In addition, in relation to the other configurations, description is omitted of configurations which are the same as those of the first embodiment, and the same reference signs are given thereto.

Figure 11A:
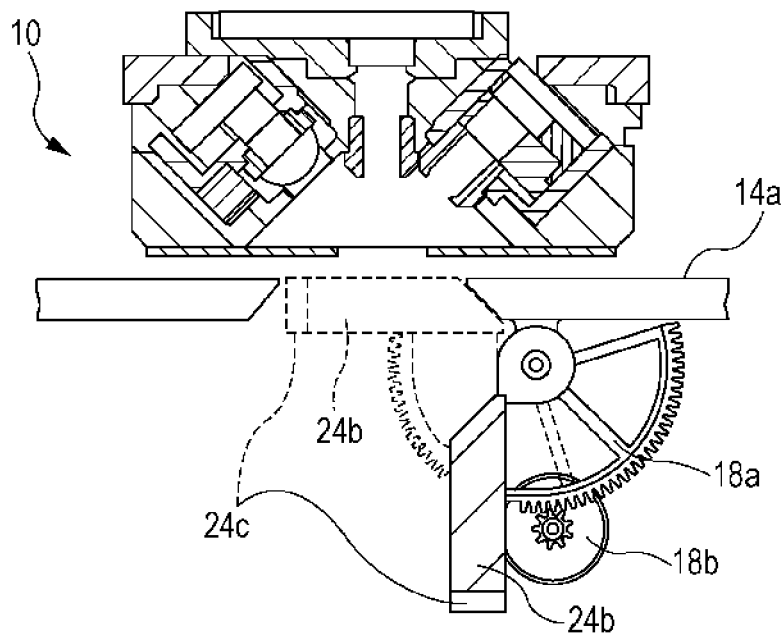
FIGS. 11A and 11B are the first views which show another embodiment of the invention.

FIG. 11A shows the second embodiment of the recording medium determination apparatus according to the invention. In the embodiment, an ultrasonic oscillating element 24c is attached to a part, which is the lower end in the withdrawn position, of a reference reflective plate 24b. Meanwhile, the wiper and the drive mechanism thereof provided in the first embodiment are omitted. When the reference reflective plate 24b is in the withdrawn position, the reference reflective plate 24b is caused to oscillate by the operation of the ultrasonic oscillating element 24c in order to cause adhered objects to fall off.

Figure 11B:
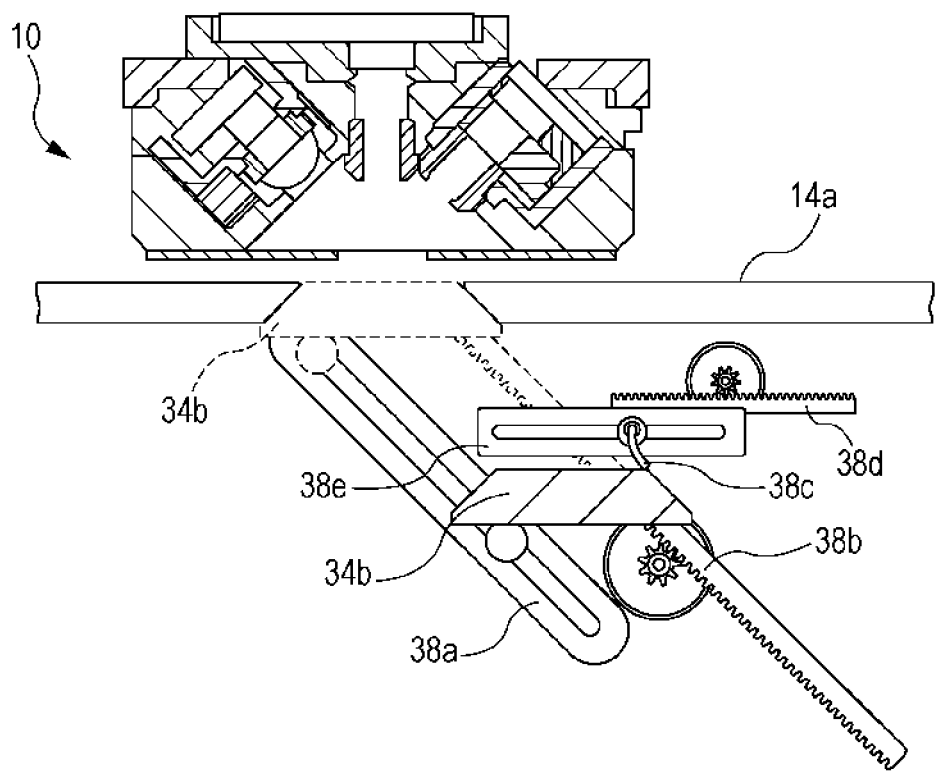

FIG. 11B shows a third embodiment of the recording medium determination apparatus according to the invention. A reference reflective plate 34b of the embodiment is attached in a free-sliding manner to a withdrawing rail, which is provided to extend diagonally downward from directly beneath the through hole of the platen 14a. For example, according to a reflective plate movement mechanism 38b formed from a rack and pinion mechanism or a linear motor, the reference reflective plate 34b moves, while maintaining a horizontal orientation, along a withdrawing rail 38a between a reflection position, in which the reference reflective plate 34b is embedded in the through hole of the platen 14a, and a withdrawn position, in which the reference reflective plate 34b is separated downward from the platen 14a. The recording medium determination apparatus is provided with a wiper 38c, a wiper rail 38e, and a wiper drive unit 38d in the vicinity of the withdrawn position. The wiper 38c abuts the upper surface of the reference reflective plate 34b. The wiper rail 38e supports the wiper 38c so as to be free-sliding in the horizontal direction. The wiper drive unit 38d reciprocally drives the wiper 38c along the extending direction of the wiper rail 38e.

In the configurations described above, in the same manner as in the first embodiment, the background of the recording medium switches between a high reflectance state and a low reflectance state due to the reference reflective plates 24b and 34b moving between the reflection position and the withdrawn position. In addition, the ultrasonic oscillating element 24c or the wiper 38c can function as the removal portion, which removes foreign objects adhered to the reference reflective plate.

Furthermore, in the first to third embodiments, the withdrawn position of the reference reflective plate is not directly beneath the through hole provided in the platen 14a, but set to a position shifted to the side. Therefore, even if foreign objects such as paper dust, which are separated from the recording medium, fall down from the through hole, the foreign objects are prevented from adhering to the reference reflective plate.

Figure 12A:
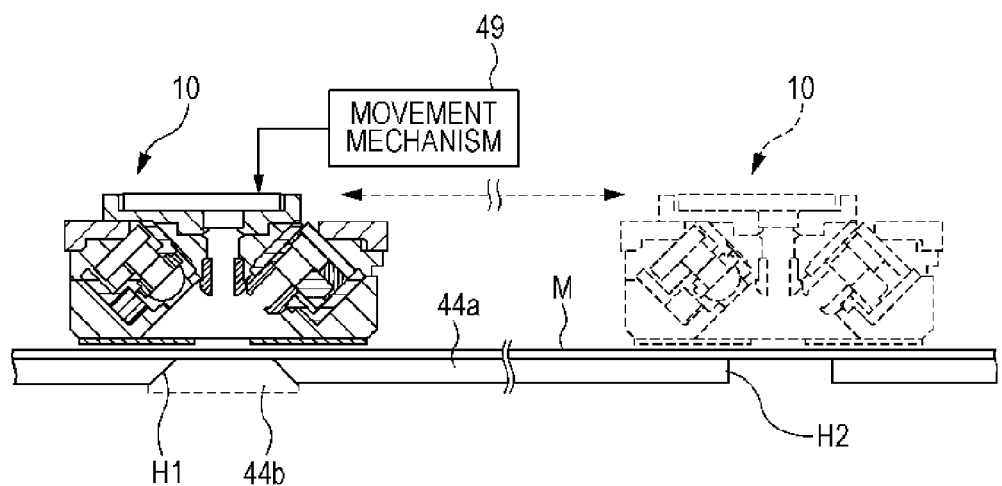
FIGS. 12A and 12B are the second views which show another embodiment of the invention.
Figure 12B:
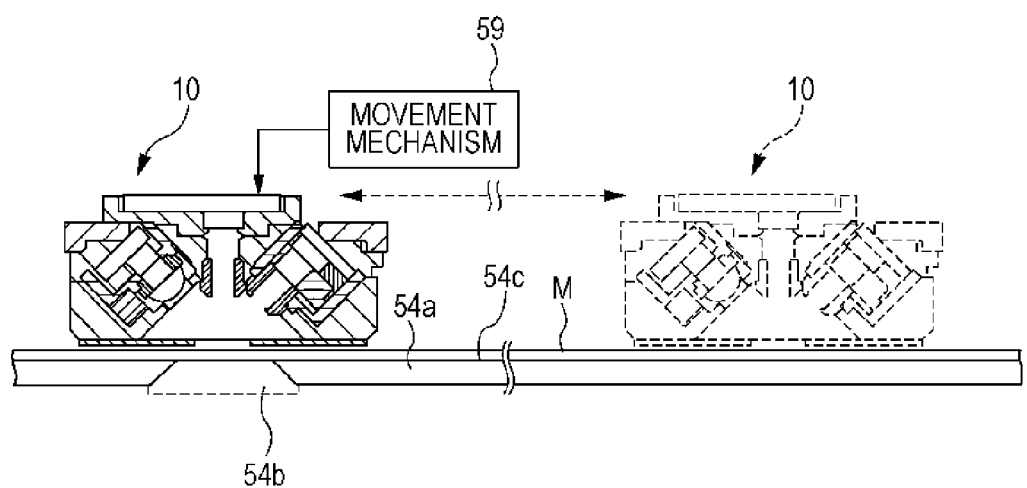

FIG. 12A shows a fourth embodiment of the recording medium determination apparatus according to the invention. In addition, FIG. 12B shows a fifth embodiment of the recording medium determination apparatus according to the invention. In the fourth and fifth embodiments, instead of inserting and removing the reference reflective plate to and from the platen, a high reflectance state region and a low reflectance state region are provided on the platen, and the switching between the high reflectance state and the low reflectance state is performed by causing the determination apparatus 10 to move between each of the opposing positions.

In the configuration of FIG. 12A, a through hole H1, to which a reference reflective plate 44b is attached, and a through hole H2, to which a reference reflective plate is not attached, are provided on a platen 44a. In addition, a movement mechanism 49, which causes the determination apparatus 10 to move between positions which oppose the through hole H1 and the through hole H2, is further provided. The high reflectance state is created when the determination apparatus 10 opposes the reference reflective plate 44b, light is radiated toward the reference reflective plate 44b, and reflected by the reference reflective plate 44b with a high reflectance. Meanwhile, a state in which the determination apparatus 10 faces the through hole H2 with no reference reflective plate is the low reflectance state.

In addition, in the configuration of FIG. 12B, a non-reflective or a black film 54c is formed on the upper surface of a platen 54a, a through hole is formed in a portion of the film 54c, and a reference reflective plate 54b is attached thereto. A moving mechanism 59 causes the determination apparatus 10 to move between a position opposing the reference reflective plate 54b and an other position opposing the upper surface of the platen 54a. In this configuration, a state in which the determination apparatus 10 is positioned in the position opposing the reference reflective plate 54b is the high reflectance state, and a state in which the determination apparatus 10 is positioned in the other position opposing the upper surface of the platen 54a is the low reflectance state.

Furthermore, while not mandatory in the configuration of FIGS. 12A and 12B, if the reference reflective plate is caused to move to an appropriate withdrawn position when not necessary, it is possible to prevent the adherence of foreign objects to the upper surface of the reference reflective plate.

Also in the embodiments described above, shifting of the optical axis with the movement of the determination apparatus 10 is prevented by performing light amount detection in a state in which the lower surface of the determination apparatus 10 is caused to abut the recording medium, and moving the determination apparatus 10 does not cause a decrease in the accuracy of the determination.

As described above, in each embodiment of the recording medium determination apparatus according to the invention, light is radiated onto the recording medium, and the thickness of the recording medium is determined from the values of the ratio between the diffuse reflection light when switching the background of the recording medium between the high reflectance state and the low reflectance state. More specifically, the value of the ratio (the light reduction ratio) of the light amount of the diffuse reflection light in the low reflectance state in relation to the light amount of the diffuse reflection light in the high reflectance state is obtained, and the thickness of the recording medium is determined by applying the obtained value to the correlations (FIG. 2) between the thicknesses and the light reduction ratios of the recording media, which are obtained in advance. Accordingly, it is possible to easily and accurately obtain the thickness of the recording medium.

In the technology in which the thickness of the recording medium is obtained in this manner, it is necessary to identify the type of the recording medium. Therefore, in the embodiments described above, in order to be able to accommodate the various recording media, the type of the recording medium is optically determined before determining the thickness.

For the determination of the type of the recording medium, in relation to specular reflection light and diffuse reflection light, the light amounts of two or more wavelength components are individually detected, respectively. Furthermore, using the detection results of the reflection light amounts of two or more wavelength components of specular reflection light and two or more wavelength components of diffuse reflection light, it is determined which of the plurality of recording media, for which the characteristics are known in advance, the recording medium, which is the determination target, is equivalent to. Accordingly, it is possible to perform determination of only the total light amount of the specular reflection light and the diffuse reflection light, and to highly accurately determine more types of the recording medium than the related art, which performs determination on the basis of fluorescence, which is excited by ultraviolet rays, or on the basis of the reflection light in the infrared region.

Since it is possible to share a portion of the results between the optical measurement for determining the type of the recording medium and the optical measurement for determining the thickness of the recording medium, it is possible to efficiently perform the series of determination processes from the determination of the type to the determination of the thickness in a short time. In addition, it is possible to share the apparatus configuration for detection.

In this determination method, both the light source and the light receiving unit can be configured using devices which operate in the visible light region. Since there are many practical products as such a device, by appropriately selecting therefrom, it is possible to configure a determination apparatus according to the usage case, the price or the like.

As described above, in the embodiment, the determination apparatus 10 is equivalent to the "recording medium determination apparatus" of the invention, the light source unit 11 functions as the "light radiation unit" of the invention, and the diffuse light reception unit 13 functions as the "light receiving unit" of the invention. In addition, the reference reflective plates 14b, 141 and the like function as the "reflection portion" of the invention, and the reflective plate rotation mechanism 18, the reflective plate movement mechanism 38b and the like, which drive the reference reflective plates, function as the "switching unit" of the invention. In addition, in the embodiment described above, the control unit 15 functions as the "determination unit" of the invention.

In addition, in the fourth and fifth embodiments described above, since it is possible to switch between the high reflectance state and the low reflectance state by the movement mechanisms 49 and 59 causing the determination apparatus 10 to move, the movement mechanisms 49 and 59 function as the "switching unit" of the invention. In addition, in each of the embodiments described above, the wipers 18c, 38c, the ultrasonic oscillating element 24c and the like function as the "removal portion" of the invention.

Furthermore, the invention is not limited to the embodiments described above, and various modifications can be made in addition to the configurations described above without departing from the spirit of the invention. For example, in the embodiments described above, the type of the recording medium is determined from the detection results of the reflection light and the thickness is determined in consideration of the determined type. However, the process to determine the type of the recording medium is not mandatory. For example, in a case in which the type of the recording medium is specified in advance, or the type of the recording medium is identified by the user inputting settings thereof, it is possible to omit the determination of the type of the recording medium. In addition, the determination of the type may also be performed using another method.

In addition, in the embodiment described above, white light is radiated onto the recording medium, the reflection light is spectrally dispersed into components of each color of RGB and received. However, the invention is not limited thereto. In other words, for the purpose of obtaining the thickness of the recording medium, the radiated light may also be monochromatic light. For example, it is possible to use a red LED as the "light radiation unit" of the invention, and to use a light receiving element, which does not have a color decomposition function, such as a photo-conductive cell, which uses, for example, a semiconductor sensor, a photo-multiplier tube, and a photo-conductive material such as cadmium sulfide as the "light receiving unit".

In addition, even in a case in which the processes are performed using a plurality of color components, instead of white light containing a plurality of wavelength components, a configuration may also be adopted in which, for example, a multicolored LED is used, the wavelength of emitted light is switched at the radiated light source side and is output. Even in this case, the color decomposition function is not necessary in the light receiving unit.

In addition, in the determination apparatus 10 and the recording medium determination process using the determination apparatus 10 described above, the determination apparatus 10 is caused to closely adhere to the recording medium. This is in order to stabilize the optical axis of the specular reflection light from the light source apparatus to the specular reflection light reception apparatus, and to prevent the penetration of external light. However, depending on the usage, the raising and lowering mechanism of the determination apparatus may be omitted. For example, a case in which the determination apparatus is installed in the inner portion of the housing of a printing apparatus and there is no influence of external light is equivalent to the configuration in which the raising and lowering mechanism is omitted.

In addition, in the embodiments described above, determination is performed with the determination apparatus disposed above the recording medium, which is placed on a planar platen. However, the positional relationship between the recording medium and the determination apparatus is not limited thereto, for example, the determination apparatus may be provided to the side of the recording medium, which is transported in a perpendicular direction. In addition, the determination apparatus may also be disposed on the lower surface side of the recording medium, which is placed horizontally. In addition, in addition to a configuration in which the recording medium is placed on a planar platen, a configuration may also be adopted in which light is radiated onto the surface of the recording medium, which is pushed against a guide member, or onto the surface of the recording medium, which is wound around a roller and is curved, and the reflection light is detected.

In addition, it is not necessary that the recording medium be static during the determination process, and a configuration may also be adopted in which the recording medium is transported at a predetermined transportation speed, and the reflection light is detected by radiating light onto the surface of the recording medium, which is moving.

The entire disclosure of Japanese Patent Application No.2013-000372, filed Jan. 7, 2013 and 2013-268711, filed Dec. 26, 2013 are expressly incorporated by reference herein.

What is claimed is:

1. A recording medium determination apparatus, comprising:
   a light radiation unit which radiates light toward a recording medium;
   a light receiving unit which receives diffuse reflection light, which is light radiated from the light radiation unit and diffuse reflected by the recording medium;

a reflection portion which can reflect transmitted light, which is radiated from the light radiation unit and transmitted through the recording medium, to cause the transmitted light to be incident to the recording medium again;

a switching unit which switches a reflectance state such that a reflectance of the reflection portion changes; and a determination unit which determines a thickness of the recording medium on a basis of a value of a ratio between light amounts of a plurality of the diffuse reflection lights which are reflected by the reflection portion in different reflectance states and are received by the light receiving unit.

2. The recording medium determination apparatus according to claim 1,
wherein the determination unit determines the thickness of the recording medium on the basis of information relating to a correlation between values of ratios between the thickness of the recording medium and the light amount of the diffuse reflection light, which are obtained in advance for each type of the recording medium.

3. The recording medium determination apparatus according to claim 1,
wherein the determination unit determines the thickness of the recording medium on the basis of the light amount of a wavelength component within the diffuse reflection light with a wavelength of 650 nm or more.

4. The recording medium determination apparatus according to claim 1,
wherein the switching unit changes the distance of the reflection portion in relation to a support portion of the recording medium.

5. The recording medium determination apparatus according to claim 1,
wherein the switching unit can change a relative positional relationship between the light radiation unit and the reflection portion.

6. The recording medium determination apparatus according to claim 1, further comprising:
a removal portion which removes foreign objects adhered to an opposing surface, which opposes the recording medium, of the reflection portion.

7. A recording medium determination method, comprising:
radiating light toward a recording medium; and
determining a thickness of the recording medium on a basis of a value of a ratio between light amounts of a plurality of the diffuse reflection lights which are received in different reflectance states, such that a reflectance of transmitted light is different by switching a reflectance state, in which the transmitted light which is transmitted through the recording medium is reflected and incident to the recording medium again.

* * * * *